United States Patent [19]
Dai et al.

[11] Patent Number: 5,441,630
[45] Date of Patent: * Aug. 15, 1995

[54] HYDRODESULFURIZATION PROCESS

[75] Inventors: Eugene P.-S. Dai, Port Arthur; David E. Sherwood, Jr.; Bobby R. Martin, both of Beaumont; Randall H. Petty, Port Neches, all of Tex.

[73] Assignee: Texaco, Inc., White Plains, N.Y.

[*] Notice: The portion of the term of this patent subsequent to Aug. 23, 2011 has been disclaimed.

[21] Appl. No.: 45,151

[22] Filed: Apr. 12, 1993

[51] Int. Cl.$^6$ .............. C10G 45/60; C10G 45/08
[52] U.S. Cl. .............. 208/216 PP; 208/217; 208/230
[58] Field of Search .............. 208/216 R, 216 PP

[56] References Cited

U.S. PATENT DOCUMENTS

| | | | |
|---|---|---|---|
| 2,853,429 | 9/1958 | Gislon et al. | 196/24 |
| 3,269,938 | 8/1966 | Lefrancois | 208/142 |
| 3,539,306 | 11/1970 | Kumura et al. | 23/315 |
| 3,650,704 | 3/1972 | Kumura et al. | 23/315 |
| 3,705,097 | 12/1972 | Head et al. | 208/217 |
| 3,956,105 | 5/1976 | Conway | 208/111 |
| 4,132,632 | 1/1979 | Yu et al. | 208/216 |
| 4,140,626 | 2/1979 | Bertolacini et al. | 208/216 R |
| 4,454,244 | 6/1984 | Woltermann | 502/108 |
| 4,844,790 | 7/1989 | Occelli | 208/216 R |
| 4,962,237 | 10/1990 | Laycock | 568/618 |

FOREIGN PATENT DOCUMENTS

0476489A1 9/1991 European Pat. Off. ....... C07C 5/41
2225731A 11/1988 United Kingdom.

OTHER PUBLICATIONS

R. Coates, E. C. Myers, T. A. Sue-A-Quan, "Desulfurization of Cat Cracked Naphthas," 1978 NPRA Annual Meeting, Mar. 19-21, 1978 San Antonio, pp. 1-22.

F. Cavani, O. Clause, F. Trifiro, A. Vaccari, "Anionic Clays With Hydrotalcite-Like Structure as Precursors of Hydrogenation Catalysts" Materials Res. Soc. Extended Abstract (EA-24), 1990, pp. 85-88.

O. Clause, M. Gazzano, F. Trifiro and A. Vaccari and L. Zatorski, "Preparation and thermal reactivity of nickel/chromium and nickel/aluminum hydrotalcite-type precursors," Applied Catalysts, 73 (1991) 217-236.

Primary Examiner—Helane Myers
Attorney, Agent, or Firm—Kenneth R. Priem; Cynthia L. Hunter; Walter D. Hunter

[57] ABSTRACT

Hydrodesulfurization of a cracked naphtha is effected in the presence of, as catalyst, a non-noble metal of Group VIII and a metal of Group VI-B on an alumina support containing a hydrotalcite-like composition. The process of the instant invention gives high levels of hydrodesulfurization compared to prior art magnesia-containing catalysts and lower levels of olefin saturation, and less octane reduction in the desulfurized gasoline.

16 Claims, No Drawings

HYDRODESULFURIZATION PROCESS

FIELD OF THE INVENTION

This invention relates to hydrodesulfurization of cracked naphtha. More particularly it relates to a process for selectively hydrodesulfurizing cracked naphtha in the presence of a catalyst.

BACKGROUND OF THE INVENTION

As is well known to those skilled in the art, cracked naphtha (obtained as product of a cracking operation or a coking operation) may contain a significant quantity of sulfur—up to as much as 13,000 wppm; and this material contributes a substantial quantity of undesired sulfur to the gasoline pool to which it is commonly passed. It is possible to decrease the sulfur content by (i) hydrotreating the whole feedstock to the cracking/coker unit or (ii) hydrotreating the product naphtha from these units.

The first noted alternative is a "brute force" effort that is very expensive in that it requires a large hydrotreater and it consumes significant quantities of hydrogen. The second-noted alternative is a more direct approach—but unfortunately it results in undesirable saturation of the olefins (typically originally present in amount of 20 v %–60 v %) and down to levels as low as 2 v %; and this reduces the octane number (Octane Number is the average of the Research Octane Number RON and the Motor Octane Number MON) of the product gasoline by as much as 10–20 units. Prior art desulfurization of full range FCC naphtha from 300 wppm down to 20 wppm of sulfur results in a typical decrease in octane number by about 14 units. This loss in octane number associated with desulfurization has a significant impact on the octane number of the refinery gasoline pool.

Typical prior art disclosures which are directed to hydrodesulfurization include:

U.S. Pat. No. 4,140,626 (Bertolacini and Sue-A-Quan) describes a selective hydrodesulfurization process employing a catalyst with a Group VIB metal and a Group VIII metal deposited on a support consisting of at least 70 wt % magnesium oxide (MgO). Preferably, the Group VIB- metal is molybdenum and the Group VIII metal is cobalt. Catalyst A (a catalyst of the invention of Bertolacini) contains 3 wt % CoO/~16 wt % MoO3 on a pure MgO support. Catalyst B was a sample of commercial Criterion HDS-2A CoMo on alumina hydrotreating catalyst (with similar levels of CoO and MoO3). Catalyst A was better than Catalyst B for hydrodesulfurization (HDS). In addition, catalyst A produced better octane numbers than Catalyst B at equivalent values of HDS (in the range of 75–85% HDS); however, the improvement was only ~1.5 octane numbers. Surprisingly, for both catalysts, olefin saturation was fairly low (< ~40 wt %) and octane penalties were fairly insignificant (< ~2 octane numbers) for the ranges of HDS studied. Other catalysts of the invention (prepared on supports with at least 70 wt % magnesium oxide) gave HDS improvements.

U.S. Pat. No. 4,132,632 (Yu and Myers) is very similar to the above described patent except that the metal loadings are restricted to 4–6 wt % for the Group VI-B metal and 0.5–2 wt % for the Group VIII metal. Again, preferably, the Group VI-B metal was molybdenum and the Group VIII metal was cobalt. Catalyst I (a catalyst of Yu et al) was ~1 wt % CoO/~5 wt % MoO3 on a pure MgO support. Catalyst II contains ~3 wt % CoO/~17 wt % MoO3 on a support comprising 80 wt % MgO (i.e. a catalyst of U.S. Pat. No. 4,140,6626 supra). Catalyst I generally gives poorer HDS than Catalyst II, but Catalyst I gives less olefin saturation and better octane numbers at around the same level of HDS (~82–84%). The incremental octane improvement is small (~1.6 octane numbers). Again, for both catalysts, olefin saturation is fairly low (< ~40 wt %) and octane penalties are fairly insignificant (< ~2.6 octane numbers) for the ranges of HDS studied.

A paper entitled "DESULFURIZATION OF CAT CRACKED NAPHTHAS WITH MINIMUM OCTANE LOSS" presented at the 1978 NPRA Annual Meeting in San Antonio, Texas by Coates, Myers and Sue-A-Quan sets forth a good overview of the development of what Amoco called their "Selective Ultrafining Process." The paper was presented about one year before the above described patents issued. The paper mentions two catalysts (presumably from the two patents). Sulfiding technique is mentioned as a major concern. The new catalysts show lower rates of deactivation than standard hydrotreating catalysts for HDS. Incremental octane improvements are said to be 4 MON and 4.5 RON at 90% HDS. The incremental octane improvements of the presentation were much larger than those shown in the subsequent Amoco patents.

GB 2,225,731 discloses hydrotreating catalysts comprising Group VI and Group VIII metal hydrogenation components on a support which comprises magnesia and alumina in a homogeneous phase. The mole ratio of Mg to Al is 3–10:1. The catalyst is said to have comparable HDS activity to similar catalysts based on alumina.

Additional background may be noted from:
 (i) U.S. Pat. No. 3,539,306 to Kyowa Chemical Industry Co. as assignee of Kumura et al;
 (ii) U.S. Pat. No. 3,650,704 to T. Kumura et al;
 (iii) Cavani et al "Anionic Clays with Hydrotalcite-like Structure as Precursors of Hydrogenation Catalysts Mat. Res. Soc. Extended Abstracts" (EA-24)—Pub by Materials Research Society; and
 (iv) O. Clause et al Preparation and Thermal Reactivity of Nickel/Chromium and Nickel/Aluminum Hydrotalcite-type Precursors Applied Catalysts 73 (1991) 217–236 Elsevier Science Publishers;
 (v) Eur. Pat. Application 0 476 489 A1 to Haldor Topsoe A/S as assignee of E. G. Derouane et al;
 (vi) U.S. Pat. No. 3,705,097 issued 5 Dec. 1972 to Dow Chemical Co. as assignee of B. D. Head et al;
 (vii) U.S. Pat. No. 3,956,105 issued 11 May 1976 to Universal Oil Products as assignee of J. E. Conway.
 (viii) U.S. Pat. No. 4,962,237 issued 9 Oct. 90 to Dow Chemical Company as assignee of D. E. Laycock.

The conventional catalysts for naphtha hydrotreating include CoMo, NiMo, NiW, CoMoP, and NiMoP metal oxides supported on gamma alumina typified by the commercial Criterion C-444 CoMo hydrotreating catalyst. Magnesia supported catalysts and silica-magnesia supported catalysts are disclosed in U.S. Pat. No. 2,853,429 and 3,269,938 respectively. The commercial BASF K8-11 catalyst, used in the water gas shift conversion, generally contains 4 wt % CoO and 10 wt % MoO3 on a magnesia-alumina-silica support. Contrary to the claimed advantages of the above-described Amoco patents and paper, one of the common drawback of catalysts on magnesia-containing supports is the low HDS activity compared to alumina (particularly gamma alumina) supported catalysts. It is commonly believed that the low surface area of magnesia-containing supports and the poor dispersion of $MoO_3$ on magnesia-containing supports are the cause of the low HDS activities.

It is an object of this invention to provide a novel hydrodesulfurization process. It is another object of this invention to provide a magnesium-containing catalyst with a very high hydrodesulfurization activity. Other objects will be apparent to those skilled in the art.

STATEMENT OF THE INVENTION

In accordance with certain of its aspects, this invention is directed to a process for selective hydrodesulfurization of a cracked naphtha containing paraffins, isoparaffins, aromatics, naphthenes, and olefins which comprises maintaining in a reaction zone a bed of catalyst containing a non-noble Group VIII metal and a metal of Group VI-B on an inert support containing a hydrotalcite-like composition;

passing said cracked naphtha containing paraffins, isoparaffins, aromatics, naphthenes, and olefins to said reaction zone and into contact with said bed of catalyst;

maintaining said bed of catalyst at hydrodesulfurizing conditions thereby producing a product stream of hydrodesulfurized cracked naphtha; and recovering said product stream of hydrodesulfurized cracked naphtha.

DESCRIPTION OF THE INVENTION

The charge which may be treated by the process of this invention may be a naphtha, typically a full range naphtha which is recovered from a cracking or coking unit. Typically the cracked naphtha will be recovered from a fluid catalytic cracking (FCC) unit. The charge naphthas which may be treated may be characterized by the following properties:

TABLE

| Property | Broad | Preferred | Typical |
|---|---|---|---|
| API | 50-76 | 52-60 | 58 |
| Boiling Range °F. | | | |
| ibp | 50-240 | 90-200 | 95 |
| 10 v % | 120-260 | 145-225 | 145 |
| 50 v % | 200-310 | 210-286 | 210 |
| 90 v % | 300-380 | 305-360 | 351 |
| ep | 320-438 | 360-420 | 400 |
| Sulfur (wppm) | 300-13,000 | 1100-10,000 | 2,000 |
| Paraffins plus | | | |
| isoparaffins v % | 25-40 | 30-38 | 36 |
| Aromatics v % | 5-25 | 8-20 | 15 |
| Naphthenes v % | 5-20 | 10-19 | 16 |
| Olefins v % | 20-60 | 25-45 | 33 |
| RON | 60-95 | 73-93 | 91 |
| MON | | | |

In practice of the process of this invention, the charge naphtha is passed to a bed of hydrodesulfurization catalyst. Although it may be possible to utilize a fluid bed or an ebullated bed, it is preferred to utilize a gravity packed bed.

The catalyst is formed on a support which contains 40 parts-99 parts, preferably 50 parts-85 parts, say 75 parts of inert composition-typically metal oxide-type support such as silica, silica-alumina, magnesia, titania, etc. The preferred support is alumina, preferably gamma alumina.

There is mixed with the support, a hydrotalcite-like composition of the formula $$[X_a Y_b (OH)_c]_n [A]_d \cdot e \cdot H_2O$$

$a = 1–10$ $b = 1–10$ $c = 2(a+b) = 4–40$

A is an anion of formal negative charge n $n =$ an integer 1–4 d is the formal positive charge of $[X_a Y_b (OH)_c]$ $e = 1–10$

X is a divalent metal

Y is a trivalent metal of Group III or Group VI-B or non-noble Group VIII of the Periodic Table.

subject to the qualification that when one of d or n is an integral multiple of the other, they are both reduced to lowest integral terms.

The metal X may be a Group II-A metal such as beryllium (Be), magnesium (Mg), calcium (Ca), strontium (Sr), barium (Ba), or radium (Ra). The preferred metal is magnesium (Mg). More than one metal X may be present.

The metal Y may be boron (B), aluminum (Al), gallium (Ga), indium (In), or thallium (Tl) of Group III or iron Fe, cobalt Co, or nickel Ni of non-noble Group VIII or chromium Cr, molybdenum Mo, or tungsten W of Group VI-B. The preferred metal is aluminum (Al). More than one metal Y may be present.

a may be 1–10, preferably 3–6, say 4.5.

b may be 1–10, preferably 1–3, say 2.

c may be 4–40, preferably 10–16, say 13.

n may be an integer 1–4, preferably 1–2, say 2.

d may be 1–4, preferably 1.

e may be 1–10, preferably 3–4, say 3.5.

The A anion is selected from $CO_3=$, halogen eg Cl—, acetate $C_2H_3O_2$—, oxalate $HC_2O_4=$, or $C_2O_4=$, $NO_3^-$, $SO_4=$, or $ClO_4^-$. The preferred anion may be $CO_3=$ which has a formal charge of $2^-$.

Illustrative hydrotalcite-like (HTlc) compositions may be those noted in the following table—the first listed (hydrotalcite (HT) available commercially under the designation DHT-4A), being preferred:

TABLE

| |
|---|
| $[Mg_{4.5}Al_2(OH)_{13}][CO_3].3.5.H_2O$ |
| $[Mg_6Al_2(OH)_{16}][CO_3].4H_2O$ |
| $[Mg_6Al_2(OH)_{16}][NO_3].4.H_2O$ |
| $[Ca_6Al_2(OH)_{16}][SO_4].4.H_2O$ |
| $[Zn_3Cr(OH)_8][NO_3].4.H_2O$ |
| $[Ni_5Al_2(OH)_{14}][NO_3]_2.4.H_2O$ |
| $[Mg_4Fe(OH)_{10}][NO_3].4.H_2O$ |

Hydrotalcite mineral $[Mg_6Al_2(OH)_{16}CO_3.4H_2O]$ is a hydroxycarbonate of magnesium and aluminum and occurs naturally in the Urals of the Soviet Union and also in Snarum, Norway. In 1966 Kyowa Chemical Industry Co., Ltd. succeeded in the world's first industrial synthesis of hydrotalcite. (U.S. Pat. No. 3,539,306 and industrial synthesis of hydrotalcite. (U.S. Pat. No. 3,539,306 and 3,650,704). DHT-4A $[Mg_{4.5}Al_2(OH)_{13}CO_3.3.5H_2O]$ is a hydrotalcite-like compound. The first papers in the literature referring to hydrotalcite-like compounds appeared in 1971, written by Miyata et al., dealing with basic catalysts (S. Miyata et al., Nippon Kagaku Zasshi, 92 (1971) 514) and in 1977 by Miyata (S.

Miyata, Kogaku Gijutsushi Mol, 15 (10) (1977) 32 and 15 (3) 1971 31).

The preparation, properties and applications of hydrotalcite-type anionic clays is reviewed by F. Cavani et al in CATALYSIS TODAY, Vol. 11, No. 2, 1991. The properties of the DHT4A product is detailed in the data sheets provided by Kyowa Chemical. The natural product of calcination or activation in inert gas of a HTlc is believed to be a spinel $AB_2O_4$, together with free AO. In the range between the temperature at which HTlc decomposition commences (between 572 and 752 F.) and that of spinel formation (1652° F.), a series of metastable phases form, both crystalline and amorphous. Therefore, the surface area, pore volume, and structure depend on the temperature of calcination. Upon calcination, the crystal structure of DHT-4A is decomposed at about 660° F. when water and carbon dioxide evolved from the structure, and a $MgO-Al_2O_3$ solid solution of formula 4.5 $MgO.Al_2O_3$ is formed. This solid solution is stable up to 1472° F. MgO and $MgAl_2O_4$ are formed at about 1652° F. On the other hand, the solid solution calcined at less than 1472° F. can be restored to the original structure by hydration.

The most interesting properties of the calcined HTlc are 1) high surface area, 2) basic properties, and 3) formation of homogeneous mixtures of oxides with very small crystal size. Miyata et al., showed that there is a maximum in the number of basic sites when the HTlc is calcined at 932° F. Nakatsuka et al. examined the effect of the Mg/Al ratio in the HT on the basic strength and the amount of basic sites. (Bull. Chem. Soc. Japan, 52 (1979) 2449). The number of basic sites increased with Mg/Al ratio, while the number of acid sites decreased; however the compound with ratio $MgO/Al_2O_3$ of 5.23 exhibited the greatest number of basic sites per unit of surface area. The HTlc and the calcined HTlc have found applications in basic catalysis, hydrogenation of nitrobenzene, oxidation reaction, and support for Ziegler-Natta catalysts. U.S. Patent No. 4,962,237 discloses a catalytic process for the preparation of polyols using the calcined DHT-4A.

The compositions may be readily available commercially from Kyowa Chemical Industry Co. Ltd. of Kagawa, Japan. The preferred composition is marketed under the trademark DHT-4A, having the formula:

$$Mg_{4.5}Al_2(OH)_{13}CO_3.3.5H_2O$$

The catalyst support may be formed by mixing 10–840 parts, preferably 200–750 parts, say 300 parts of hydrotalcite-like composition with 360–1190 parts, preferably 500–1000 parts, say 900 parts of inert support, preferably 700–900 parts, say 800 parts of water and 5–40 parts, preferably 10–30 parts, say 24 parts of acid such as nitric acid. After mulling, the mixture is cast or extruded to form cylinders of diameter of about 0.8–1.6 mm, say 1.3 mm and length of 2.5–15 mm, say 3.8 mm. The cross-section of the particles is preferably trilobar.

The particles are dried at 220° F.–400° F., preferably 220° F.–300° F., say 220° F. for 10–30, preferably 12–24, say 16 hours and thereafter calcined at 1000° F.–1200° F., preferably 1050° F.–1150° F., say 1100° F. for 0.2–3 hours, preferably 0.4–2 hours, say 0.5 hours.

The so-formed composition is typically characterized by the following properties:

TABLE

| Property | Broad | Preferred | Typical |
|---|---|---|---|
| Total Pore Vol. cc/g | 0.5–1 | 0.7–0.9 | 0.7 |
| Pore Size Dist. cc/g | | | |
| >1500Å | 0.001–0.02 | 0.01–0.02 | 0.011 |
| >500Å | 0.01–0.5 | 0.01–0.4 | 0.014 |
| >250Å | 0.01–0.5 | 0.01–0.02 | 0.014 |
| >100Å | 0.15–0.6 | 0.2–0.6 | 0.22 |
| <100Å | 0.3–0.6 | 0.35–0.55 | 0.50 |
| Pore Mode Å | | | |
| dv/dD Max | 55–65 | 57–63 | 61 |
| BET | 55–65 | 60–65 | 63 |
| Total Surface Area $M^2/g$ | 200–350 | 220–335 | 330 |

Preparation of the catalyst of this invention is effected by contacting the support with preferably aqueous solutions of Group VI-B and non-noble Group VII metal. The non-noble Group VIII metal may be iron Fe, cobalt Co, or nickel Ni, preferably cobalt; and the metal may be added, in solution in amount sufficient to fill the pores of the support—preferably as an aqueous solution of a soluble cobalt salt such as the acetate, nitrate, carbonate, etc. The Group VI-B metal may be chromium Cr, molybdenum Mo, or tungsten W, preferably molybdenum, typically as the acetate, oxide, chloride, or carbonate. Ammonium molybdate may be employed.

The metals may be added simultaneously or sequentially. After addition, the support bearing the metals is dried at 50° F.–100° F., preferably 60° F.–90° F., say 70° F. for 0.5–24 hours, preferably 1–4 hours, say 2 hours and then at higher temperature of 220° F.–400° F., preferably 250° F.–300° F., say 250° F. for 1–8 hours, preferably 2–6 hours, say 4 hours. Thereafter the catalyst is calcined at 600° F.–1000° F., preferably 700° F.–900° F., say 800° F. for 1–8 hours, preferably 2–6 hours, say 4 hours and thereafter at higher temperature of 800° F.–1200° F., preferably 900° F.–1100° F., say 1010° F. for 0.5–5 hours, preferably 1–3 hours, say 2 hours. The finished catalyst is further characterized as follows (parts by weight).

TABLE

| Component | Broad | Preferred | Typical |
|---|---|---|---|
| Alumina | 30–99 | 40–80 | 62 |
| Hydrotalcite-like Composition | 1–70 | 20–60 | 20 |
| Group VIII | 0.1–6 | 1–5 | 3 |
| Group VI-B | 0.1–25 | 10–18 | 15 |

A preferred catalyst includes:
(i) 1–70 w %, say 20 w %, of the DHT-4A (from Kyowa Chemical) synthetic hydrotalcite-like composition containing $$Mg_{4.5}Al_2(OH)_{13}CO_3.3.5H_2O$$

(ii) 30–99 w %, say 62 w %, of gamma alumina
(iii) 0.1–6 w %, say 3 w % of CoO
(iv) 0.1–25 w %, say 15 w % of $MoO_3$ The percentage figures for CoO and $MoO_3$, are % of metal oxides in the finished catalyst.

Selective hydrodesulfurization of cracked naphtha may be effected by passing a charge cracked naphtha in liquid phase through a gravity-packed bed of catalyst at the following input conditions:

| Conditions | Broad | Preferred | Typical |
| --- | --- | --- | --- |
| Temp (°F.) | 450–700 | 500–670 | 550 |
| Total Pressure (psig) | 200–800 | 350–500 | 400 |
| H$_2$ Feed Rate SCFB | 500–2000 | 800–1500 | 1000 |
| H$_2$ Purity v % | 65–100 | 80–99 | 95 |
| LHSV | 1–10 | 2–7 | 5 |

During hydrodesulfurization, the sulfur content of the cracked naphtha is decreased from a charge level of 300–13,000 wppm, preferably 1100–10,000 wppm, say 2000 wppm down to a product level of 50–440 wppm, preferably 50–240 wppm, say 56 wppm.

It is a particular feature of the process of this invention that it is characterized by the following advantages:
(i) It permits attainment of greater hydrodesulfurization activity than is attained by prior art magnesia-containing catalysts—typically an HDS activity of greater than 35% HDS is observed at moderate 550° F. temperatures whereas, at comparable conditions, control processes show HDS activities of less than 25% HDS. The process of the instant invention typically gives HDS activities >85% HDS at 650° F. temperatures.

HDS Activity is the percent hydrodesulfurization HDS measured for a standard sample in a standard hydrodesulfurization test charging a standard feedstock.
(ii) It permits attainment of high levels of hydrodesulfurization at temperature as low as 550° F. (Control runs must be carried out at temperatures as much as 100° F. higher to obtain comparable HDS Activity). This is particularly desirable in that higher temperatures, particularly above 670°–680° F. are conducive to undesirable cracking.
(iii) It permits attainment of these high levels of hydrodesulfurization under conditions such that decreased olefin saturation (OS) occurs at accompanying high level of hydrodesulfurization. For example, the instant process at an HDS Activity of 80.0% gives an Olefin Saturation of 20.6% while a control run operating at similar temperature (but at half the liquid hourly space velocity, to increase the HDS to the 80% level) gives an Olefin Saturation of 22.8. Thus the instant process shows 80% HDS Activity (while operating at the same temperature but at twice the feed rate compared to the control) and at an Olefin Saturation of only 20.6/22.8) or 90% of the control.

Olefin Saturation is measured by the FIA technique (ASTM D-1319) and by the PIONA/PIANO Analyses using gas chromatography techniques. The PIANO method (Paraffins, Isoparaffins, Aromatics, Naphthenes, and Olefins) has been found to be particularly suitable for measuring feed and product properties.

The product hydrodesulfurized cracked naphtha commonly has a sulfur content as low as 50–440 wppm, preferably 50–240 wppm, say 56 wppm and the sulfur content is 67%–97%, preferably 83%–97%, say 95% lower than that of the charge. The olefin content of the product is typically 3–24 v %, preferably 5–24 v %, say 20 v %.

It is a feature of the process of this invention that the loss in octane number typically is less than that observed in prior art processes which may show a loss of as much as 14 units. The process of the instant invention permits operation with significantly lower loss—typically a loss of as little as 1–2 octane numbers in commercial practice.

Practice of the process of this invention will be apparent to those skilled in the art from the following examples wherein all parts are parts by weight unless otherwise specified. An asterisk (*) designates a Control Example.

DESCRIPTION OF SPECIFIC EMBODIMENTS

EXAMPLE I

In this example which represents the best mode presently known of carrying out the process of this invention, the catalyst support is prepared by mixing:
(i) 3 pounds of DHT-4A powder (from the Kyowa Chemica Industry Co. Ltd. of Kagawa, Japan) having the formula

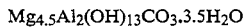

$Mg_{4.5}Al_2(OH)_{13}CO_3.3.5H_2O$ and
(ii) 9 pounds of alpha alumina monohydrate which contained 2 w % silica as a binder. The moisture content is adjusted by adding 8 pounds of deionized water and 108 ml of 70 w % nitric acid.

The mixture is mulled to homogeneity and extruded into trilobe cylindrical pellets of maximum width of 1.3 mm and length of about 3.8 mm. The wet pellets are dried at 220° F. for about 16 hours and calcined at 1100° F. for 0.5 hours.

The Total Surface Area (TSA) of this support (BET) is 330 m$^2$/g and the Total Pore Volume (TPV) by mercury porosimitry is 0.72 cc/g. This support contains 16 w % MgO and 84w % Al$_2$O$_3$.

Prior to impregnation, the support is dried again at 250° F. overnight (18 hours). The impregnating solution is prepared by dissolving 5.8 parts of ammonium molybdate in 20 parts of deionized water followed by adding 3.7 parts of cobalt nitrate hexahydrate at 140° F.

The ratio of total volume of impregnating solution to Total Pore Volume (as measured by mercury porosimetry) is about 0.97–1.05.25 g of support is impregnated with 22 ml of solution. The wet support is permitted to stand at room temperature for 2 hours, dried at 250° F. for 4 hour, calcined at 800° F. for 16 hours, and finally calcined at 1010° F. for 2 hours.

The composition and properties of the supports and the finished catalysts are set forth in the Tables infra.

EXAMPLE II

In this experimental Example, the procedure of Example I is followed except:
(i) the 50 w % DHT-4A/alumina support is prepared from 6 pounds of DHT-4A/powder and 6 pounds of alpha alumina monohydrate powder and 66 ml of 70% nitric acid and 8 pounds of water. The resulting support has a TSA of 318 m$^2$/g and a TPV of 0.92 cc/g. The catalyst support contains 32 w % MgO and 68 w % Al$_2$O$_3$.
(ii) 31 ml of impregnating solution is used rather than 22 ml as in Example I.

EXAMPLE III*

In this control Example, 30 g of commercially available gamma alumina support (cylinder 3.8 mm long and 0.8 mm diameter) are treated with 300 ml of allyl magnesium chloride (166.4 g in tetrahydrofurane (133.6 ml). The so impregnated support is dried at 250° F. overnight, calcined at 600° F. for 4 hours, and then at 800° F. for 4 hours.

The resulting support is found to contain 27.3 w % MgO and 72.7 w % Al₂O₃. This support (25 g) is impregnated with 15 ml of aqueous solution containing 5.6 g ammonium molybdate and 3.5 g of cobalt nitrate hexahydrate. The wet support is dried and calcined in the manner set forth in Example I.

EXAMPLE IV*

In this control Example, 30 g of gamma alumina support (cylinders 3.8 mm long and 0.8 mm diameter) is impregnated with 31 ml of aqueous solution containing 71 g of magnesium nitrate. The support is dried at 250° F. overnight, calcined at 600° F. for 4 hours, and then at 800° F. for 4 hours to yield a composition containing 29.5 w % MgO and 70.5 w % Al₂O₃. 25 g of this support is impregnated with 18 ml of aqueous solution containing 5.6 g ammonium molybdate and 3.5 g of cobalt nitrate hexahydrate. The wet support is dried and calcined as in Example I.

EXAMPLE V*

In this control Example, there is employed a commercially available support, obtained from United Catalysts Inc. (UCI, SN-1500S, L-3894) made by coprecipitating magnesium hydroxide and aluminum nitrate followed by extrusion. It contains about 80 w % magnesia and 20 w % alumina. This support (25 g) is impregnated with 12 ml of aqueous solution containing 5.6 of ammonium molybdate and 3.5 g of cobalt nitrate hexahydrate. The so treated compositions are dried and calcined in the same manner as in Example I.

EXAMPLE VI*

In this control Example, there is used the commercially available United Catalysts Inc. (UCI, SN-15005, L-3895) support—made by mulling magnesium carbonate and alpha alumina monohydrate. The catalyst is prepared as in Example V.

EXAMPLE VII*

This control catalyst is a commercially available catalyst (from BASF) containing CoMo on magnesia-alumina-silica support.

EXAMPLE VII-A*

In this Control Example, the procedure of Example VII* is duplicated except that the space velocity LHSV of Example VII-A* is one-half that used in Example VII*.

The approximate compositions of each of the catalysts I–VII as follows:

TABLE

| Example | MgO w % | CoO w % | MoO₃ w % |
|---|---|---|---|
| I | 13 | 3 | 15 |
| II | 26 | 3 | 15 |
| III* | 22 | 3 | 15 |
| IV* | 24 | 3 | 15 |
| V* | 66 | 3 | 15 |
| VI* | 66 | 3 | 15 |
| VII* | 23 | 4 | 14 |
| VII-A* | 23 | 4 | 14 |

Each of the catalyst systems of Examples I–VII is tested in a standard hydrodesulfurization test. The catalyst is ground to 30–60 mesh size, dried in air at 850° F. for 2 hours, and a 0.5 g sample is loaded into the reactor. Presulfiding is carried out at 750° F. for one hour with a gas stream containing 10 v % H₂S in hydrogen. The Model Feed is then admitted for 4 hours at the test temperature. The Model Feed contains 12 mol % (0.625 molar) benzothiophene in a blend of 67.5 mol % ASTM reagent grade n-heptane with 20.5 mol % 1-hexene. The average hydrodesulfurization activity (from two or more runs) is calculated as the % conversion of benzothiophene to ethylbenzene and in units of % HDS.

In each Example, there are noted (i) the %HDS (which is correlative to the w % of sulfur removed from the charge) and (ii) the OS (which indicates the w % of olefins in the charge which have been saturated).

Properties of the experimental supports and of the finished catalysts may be summarized as follows:

TABLE

| Property | Support Ex I | Support Ex II | Catalyst Ex I | Catalyst Ex II |
|---|---|---|---|---|
| DHT-4A w % | 25 | 50 | 20.5 | 41 |
| K₂O w % | 0 | 0 | 0 | 0 |
| CoO w % | 0 | 0 | 3 | 3 |
| MoO₃ w % | 0 | 0 | 15 | 15 |
| MgO w % | 16 | 32 | 13 | 26 |
| TPV cc/g | 0.7212 | 0.9223 | 0.5732 | 0.5106 |
| PV > 1500Å cc/g | 0.0114 | 0.0164 | 0.0088 | 0.0110 |
| PV > 500Å cc/g | 0.0143 | 0.3880 | 0.0151 | 0.0166 |
| PV > 250Å cc/g | 0.0148 | 0.4646 | 0.0544 | 0.0457 |
| PV > 100Å cc/g | 0.2200 | 0.5676 | 0.1541 | 0.1576 |
| PV < 100Å cc/g | 0.5012 | 0.3543 | 0.4191 | 0.3530 |
| Pore Mode Å | | | | |
| dv/dD | 61 | 62 | 63 | 57 |
| BET | 63 | 64 | 63 | 56 |
| TSA m²/g | 330 | 318 | 222 | 210 |
| (Mo/Al) int | — | — | 0.079 | 0.099 |
| (Co/Al int | — | — | 0.020 | 0.022 |
| Mo Gradient | — | — | 2.8 | 2.5 |
| Co Gradient | — | — | 1.8 | 1.8 |

The HDS Activity of the Catalyst systems of Examples I–VII is measured at 550° F., 600° F., and 650° F.

In all Tables, the internal ratio is determined by XPS and the X gradient = $(X/Al)_{ext}/(X/Al)_{int}$.

TABLE

| Example | 550° F. | 600° F. | 650° F. |
|---|---|---|---|
| I | 54.7 | 72.5 | 91.5 |
| II | 38.5 | 62.1 | 88.5 |
| III* | 22.9 | 39.6 | 62.0 |
| IV* | 11.0 | — | 29.8 |
| V* | 19.0 | 35.1 | 57.3 |
| VI* | 14.3 | — | 41.8 |
| VII* | 18.4 | 39.5 | 61.3 |
| VII-A* | 39.8 | 67.8 | 85.5 |

The Olefin Saturation of the charge to each of the Examples is determined at conditions which yield 50 w % hydrodesulfurization and 80 w % hydrodesulfurization, to be as follows:

TABLE

| | OS | |
|---|---|---|
| Example | 50 w % HDS | 80 w % HDS |
| I | 11.3 | 20.6 |
| II | 12.1 | 21.0 |
| III* | 9.6 | N.A. |
| IV* | N.A. | N.A. |
| V* | 9.0 | N.A. |
| VI* | N.A. | N.A. |
| VII* | 9.4 | N.A. |
| VII-A* | 11.8 | 22.8 |

The charge has an olefin content of 20.5 w %.

From the above, the following conclusions may be noted:

(i) At each temperature, the process of the instant invention shows higher degrees of hydrodesulfurization by a substantial factor.

(ii) At lower temperature (550° F.) the process of this invention (Examples I–II) shows hydrodesulfurization which is higher than that attained by control Examples III–VII eg at 600° F.

(iii) In runs at normal liquid hourly space velocities LHSV, the process of the instant invention permitted attainment of ≧80 % HDS, a level not achieved by control Examples III–VII*.

(iv) At 80% hydrodesulfurization, the olefin saturation is significantly decreased by about 10%—from 22.8% (in evaluation with Control Example VII-A at one-half the normal liquid hourly space velocity) down to 20.6% for the process of the instant invention.

It should be noted that in control Examples III*–VII* it was not possible to achieve target level of 80% HDS at temperatures less than those which would cause undesirable amounts of cracking (i.e. <680° F.). For control Example VII*, the 80% level of hydrodesulfurization was only attained at one-half the normal liquid hourly space velocity. All of the magnesia-containing control Examples would require much larger sized reactors to achieve high levels of HDS compared to the process of the instant invention.

Analyses of the products from the above-described reactor tests using the PIANO analyses shows that, under the test conditions employed, the n-heptane (n-C$_7$ fraction) passes through unchanged. The feed 1-hexene forms an isomerate with an approximately constant composition of 7.47 w % 1-hexenes (octane number of 69.9), 67.4 w % 2-hexenes (octane number of 86.8) and 25.2 w % 3-hexenes (octane number of 87.1). The octane number of the total C$_6$ isomerate is 85.6.

To some degree, this C$_6$ isomerate (average octane number of 85.6) is saturated to form n-hexane (octane number of 25.5). Saturation causes a loss in octane number—defined as 0.5 (RON+MON). The remaining C$_6$ isomerate and the saturated n-hexane form the C$_6$ product fraction.

It is also a feature of the process of this invention that it is characterized by smaller loss in octane number (i.e. 0.5 (RON+MON) for the C$_6$ product fraction.

TABLE

| Example | 50% HDS Octane No. | Loss | 80% HDS Octane No. | Loss |
|---|---|---|---|---|
| I | 78.8 | 6.8 | 73.2 | 12.4 |
| II | 78.3 | 7.3 | 73.0 | 12.6 |
| III* | 79.8 | 5.8 | N.A. | — |
| IV* | N.A. | — | N.A. | — |
| V* | 80.2 | 5.4 | N.A. | — |
| VI* | N.A. | — | N.A. | — |
| VII* | 80.0 | 5.6 | N.A. | — |
| VII-A* | 78.5 | 7.1 | 71.9 | 13.7 |

From the above Table, it is apparent that with a C$_6$ olefin charge forming a C$_6$ olefin isomerate having an octane number of 85.6, it is possible to operate (in Examples I–II) in accordance with practice of this invention at high levels of HDS with a loss in octane number of only 12.4–12.6 for the C$_6$ product fraction. In control Examples III–VII, high levels of HDS could not be achieved. In evaluations of control Example VII-A*, at one-half the normal liquid space velocity, a loss in octane number of 13.7 for the C$_6$ product fraction was observed at high levels of HDS.

From the above, it is clear that prior art magnesia-containing catalysts require a much lower liquid hourly space velocity (i.e. a much larger sized reactor) to achieve high levels (i.e. ≧80%) of HDS compared to the process of the instant invention. It is also clear that the process of the instant invention desirably effects lesser saturation of olefins; and it suffers a lower octane loss at high levels of HDS than do prior art processes utilizing magnesia-containing catalysts.

Although this invention has been illustrated by reference to specific embodiments, it will be apparent to those skilled in the art that various changes and modifications may be made which clearly fall within the scope of the invention.

What is claimed:

1. The process for selective hydrodesulfurization comprising removing greater than 35% of the sulfur of a cracked naphtha containing paraffins, isoparaffins, aromatics, naphthenes, and olefins while reducing olefin saturation which comprises maintaining in a reaction zone a bed of catalyst wherein the catalyst contains 0.1–6 wt % of a non-noble Group VIII metal oxide selected from an oxide of iron, cobalt or nickel and 0.1–25 wt % of a Group VIB metal oxide selected from chromium, molybdenum or tungsten, on an inert support consisting essentially of 1–70 wt % hydrotalcite composition and 30–99 wt % gamma alumina wherein the hydrotalcite composition has the formula:

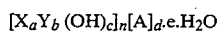

a=1–10
b=1–10
c=2(a+b)=4–40

A is an anion of formal negative charge n selected from the group consisting of carbonate, halogen, acetate, oxalate, nitrate sulfate and chlorate, n=an integer 1–4 d is the formal positive charge of [X$_a$Y$_b$(OH)$_c$]

e=1–10

X is a divalent metal selected from the group consisting of beryllium, magnesium, calcium, strontium, barium and radium, Y is a trivalent metal of Group VIII or Group VI-B or non-noble Group VIII of the Periodic Table, subject to the qualification that when one of d or n is an integral multiple of the other, they are both reduced to lowest integral terms;

passing hydrogen and said cracked naphtha containing paraffins, isoparaffins, aromatics, naphthenes, and olefins to said reaction zone and into contact with said bed of catalyst;

maintaining said bed of catalyst at hydrodesulfurizing conditions including a temperature of 500°–670° and pressure of 350–500 psig, thereby producing a product stream of hydrodesulfurized cracked naphtha; and recovering said product stream of hydrodesulfurized cracked naphtha and wherein the olefin content of said product stream is at least about 75 wt % of the olefin content of said charge cracked naphtha charged to said reaction zone.

2. The process for selective hydrodesulfurization of a cracked naphtha containing paraffins, isoparaffins, aromatics, naphthenes, and olefins as claimed in claim 1 wherein X of the composition is magnesium.

3. The process for selective hydrodesulfurization of a cracked naphtha containing paraffins, isoparaffins, aromatics, naphthenes, and olefins as claimed in claim 1 wherein Y of the composition is aluminum.

4. The process for selective hydrodesulfurization of a cracked naphtha containing paraffins, isoparaffins, aromatics, naphthenes, and olefins as claimed in claim 1 wherein a of the composition is 3–6.

5. The process for selective hydrodesulfurization of a cracked naphtha containing paraffins, isoparaffins, aromatics, naphthenes, and olefins as claimed in claim 1 wherein b of the composition is 1–3.

6. The process for selective hydrodesulfurization of a cracked naphtha containing paraffins, isoparaffins, aromatics, naphthenes, and olefins as claimed in claim 1 wherein c of the composition is 10–16.

7. The process for selective hydrodesulfurization of a cracked naphtha containing paraffins, isoparaffins, aromatics, naphthenes, and olefins as claimed in claim 1 wherein said support is gamma alumina.

8. The process for selective hydrodesulfurization of a cracked naphtha containing paraffins, isoparaffins, aromatics, naphthenes, and olefins as claimed in claim 1 wherein said composition is $$Mg_{4.5}Al_2(OH)_{13}CO_3.3.5.H_2O$$

9. The process for selective hydrodesulfurization of a cracked naphtha containing paraffins, isoparaffins, aromatics, naphthenes, and olefins as claimed in claim 1 wherein said composition is $$Mg_6Al_2(OH)_{16}CO_3.4H_2O$$

10. The process for selective hydrodesulfurization of a cracked naphtha containing paraffins, isoparaffins, aromatics, naphthenes, and olefins as claimed in claim 1 wherein said composition is $$Mg_{4.5}Al_1(OH)_{13}Cl_2.3.5H_2O.$$

11. The process for selective hydrodesulfurization of a cracked naphtha containing paraffins, isoparaffins, aromatics, naphthenes, and olefins as claimed in claim 1 wherein said hydrosulfurizing conditions include temperature of 450° F.–700° F., total pressure of 200–800 psig, inlet feed hydrogen purityh of 80–100%, liquid hourly space velocity (LHSV) of 1–10, and hydrogen feed rate of 500–2000 SCFB.

12. The process for selective hydrodesulfurization of a cracked naphtha containing paraffins, isoparaffins, aromatics, napthenes, and olefins as claimed in claim 1 wherein the sulfur content of said cracked naphtha that is 300–13,000 wppm.

13. The process for selective hydrodesulfurization of a cracked naphtha containing paraffins, isoparaffins, aromatics, naphthenes, and olefins as claimed in claim 1 wherein the olefin content of product stream of hydrodesulfurized naphtha is at least about 75 w % of the olefin content of said cracked naphtha charged to said reaction zone.

14. The process as claimed in claim 1 wherein the catalyst is characterized by a Total Pore Volume of 0.5–1 cc/g, a Pore Size Distribution such that 0.15–0.6 cc/g is present as pores of greater than 100Å and 0.3–0.6 cc/g is present as pores of less than 100Å and the Total Surface Area of the catalyst is 200–350 square meters per gram.

15. The process for selective hydrodesulfurization of a cracked naphtha containing paraffins, isoparaffins, aromatics, naphthenes, and olefins which comprises maintaining in a reaction zone a bed of catalyst containing 0.1–6 w % of non-noble Group VIII metal and 0.1–25 w % of Group VI-B on an inert support of alumina containing $$Mg_{4.5}Al_2(OH)_{13}CO_3.3.5H_2O$$

passing said cracked naphtha containing paraffins, isoparaffins, aromatics, naphthenes, and olefins to said reaction zone and into contact with said bed of catalyst;

maintaining said bed of catalyst of hydrodesulfurizing conditions thereby producing a product stream of hydrodesulfurized cracked naphtha; and recovering said product stream of hydrodesulfurized cracked naphtha.

16. The process for selective hydrodesulfurization comprising removing greater than 35% of the sulfur of a cracked naphtha containing paraffins, isoparaffins, aromatics, naphthenes, and olefins while reducing olefin saturation which comprises maintaining in a reaction zone a bed of catalyst wherein the catalyst contains 0.1–6 wt % of a non-noble metal Group VIII metal oxide selected from an oxide of iron, cobalt or nickel and 0.1 to 25 wt % of a Group VIB metal oxide selected from chromium, molybdenum or tungsten on an inert support consisting essential of 1–70 wt % hydrotalcite composition and 30–99 wt % gamma alumina wherein the hydrotalcite composition has the formula $$[X_aY_b(OH)_c]_n\ [A]_{\bar{d}}.e.H_2O$$

a = 1–10
b = 1–10
c = 2(9+b) = 4.40
A is an anion of formal negative charge n
n = an integer 1–4
d is the formal positive charge of $[X_a Y_b (OH)_c]$
e = 1–10
X is a divalent metal selected from the group consisting of beryllium, magnesium, calcium, strontium, barium and radium,
Y is a trivalent metal of Group III or Group VI-B or non-noble Group VIII of the Periodic Table,
subject to the qualification that when one of d or n is an integral multiple of the other, they are both reduced to lowest integral terms;

passing hydrogen and said cracked naphtha containing paraffins, isoparaffins, aromatics, naphthenes, and olefins to said reaction zone and into contact with said bed of catalyst;

maintaining said bed of catalyst at hydrodesulfurizing conditions including a temperature of 500°14 670° F. and pressure of 350–500 psig, thereby producing a product stream of hydrodesulfurized cracked naphtha; and recovering said product stream of hydrodesulfurized cracked naphtha wherein said catalyst is characterized by a Total Pore Volume of 0.5–1 cc/g, a Pore Size Distribution such that 0.15–0.6 cc/g is present as pores of greater than 100 Å and 0.3–0.6 cc/g is present as pores of less than 100 Å and the Total Surface Area of the catalyst is 200–350 square meters per gram and wherein the olefin content of said product stream is at least about 75wt % of the olefin content of said charge cracked naphtha charged to said reaction zone.

* * * * *

UNITED STATES PATENT AND TRADEMARK OFFICE
CERTIFICATE OF CORRECTION

PATENT NO. : 5,441,630

DATED : August 15, 1995

INVENTOR(S) : Eugene P.S. Dai, David E. Sherwood, Jr., Bobby R. Martin and Randall H. Petty It is certified that error appears in the above-identified patent and that said Letters Patent is hereby corrected as shown below:

Col. 13, line 40, delete "$Al_1$," and insert therefor -- $Al_2$ --.

Col. 14, line 54, delete "500° 14 670°" and insert therefor --500°-670°--.

Signed and Sealed this

Twenty-fourth Day of October, 1995

*Attest:*

BRUCE LEHMAN

*Attesting Officer*   *Commissioner of Patents and Trademarks*